United States Patent
Vehmas

[19]

[11] Patent Number: 6,131,412
[45] Date of Patent: Oct. 17, 2000

[54] ADJUSTING TEMPERATURE OF GLASS SHEETS IN TEMPERING FURNACE

[75] Inventor: Jukka Vehmas, Tampere, Finland

[73] Assignee: Uniglass Engineering Oy, Tampere, Finland

[21] Appl. No.: 09/194,195

[22] PCT Filed: May 21, 1997

[86] PCT No.: PCT/FI97/00300

§ 371 Date: Mar. 12, 1999

§ 102(e) Date: Mar. 12, 1999

[87] PCT Pub. No.: WO97/44282

PCT Pub. Date: Nov. 27, 1997

[30] Foreign Application Priority Data

May 22, 1996 [FI] Finland ..................... 962159

[51] Int. Cl.[7] ................................. C03B 27/00
[52] U.S. Cl. ................... 65/114; 65/29.1; 65/29.11; 65/29.19; 65/160; 65/162; 65/163; 65/348; 65/350; 65/356; 65/DIG. 4; 219/470
[58] Field of Search .................. 65/29.19, 29.1, 65/29.11, 114, 160, 163, 162, 348, 350, 356, DIG. 4; 219/470

[56] References Cited

U.S. PATENT DOCUMENTS 4,071,344  1/1978  Blausey, Jr. ................ 65/29
4,364,766  12/1982  Nitschke .
4,528,016  7/1985  Canfield et al. .

FOREIGN PATENT DOCUMENTS 83072  2/1991  Finland .
86407  5/1992  Finland .
92816  9/1994  Finland .

OTHER PUBLICATIONS

Montgomery W.S. "Horizontal vs. Vertical Batch Glass Tempering." Glass Digest (Mar. 15, 1981) pp. 82–86.

*Primary Examiner*—Stanley S. Silverman
*Assistant Examiner*—Michael P. Colaianni
*Attorney, Agent, or Firm*—Ladas & Parry

[57] ABSTRACT

A method and equipment for adjusting the temperature of glass sheets in a tempering furnace. The tempering furnace (1) comprises rollers (3) for conveying and oscillating the glass sheets (4) during heating, and resistors (5, 6) for heating the glass sheets (4) from above and from below. The temperature of the glass sheets (4) is measured inside the tempering furnace (1) during heating and the dwell time of the glass sheets (4) in the furnace is adjusted based on the temperature measurements. This enables exact control of the final temperature of the glass from the beginning, and the temperature can be kept uniform independently of the measures taken by the operator.

14 Claims, 1 Drawing Sheet

ADJUSTING TEMPERATURE OF GLASS SHEETS IN TEMPERING FURNACE

FIELD OF THE INVENTION

The invention relates to a method of adjusting the temperature of glass sheets in a tempering furnace provided with rollers, in which method the glass sheets are led on a roller conveyer through the tempering furnace, the glass sheets being heated from above and from below, and the glass sheets being oscillated in a reciprocating manner on the rollers.

The invention also relates to equipment for adjusting the temperature of glass sheets in a tempering furnace provided with rollers, the equipment comprising a tempering furnace, means for heating the glass sheets from above and from below, horizontal rollers inside the tempering furnace for supporting horizontal glass sheets and forming their conveyor, the rollers being adapted to oscillate the glass sheets in a reciprocating manner during heating.

BACKGROUND AND PRIOR ART

Current glass tempering machines employ what are known as oscillating roller furnaces in which glass is heated mainly by radiation. In the tempering process the temperature of the glass is increased above the softening point of glass in order to enable the glass to be tempered. Said temperature is between 610 and 625° C. depending on the thickness of the glass. The glass is then cooled at desired speed typically using forced convection whereby air jets are blown at the glass from above and from below. This method enables high heat-transfer coefficients, necessary when thin glass is concerned in order to achieve a sufficient temperature difference between the surface and center of the glass. Examples of oscillating roller furnaces are disclosed in FI patents 83,072 and 86,407.

A typical problem with tempering furnaces is that the furnace has to be operated manually as to the final temperature of the glass. Glass temperature is controlled afterwards based on the final result of the heating of a previous load, The temperature is typically measured by a pyrometer disposed outside the furnace between the furnace and a cooling unit, whereby the furnace has to be controlled by intermediate measurements such that the operator increases or decreases the heating time of the glass in the following load. Furthermore, attempts are made to keep the furnace in a constant state. The system operates when the furnace has reached a balanced state, the loads being of equal weight and size. The problem is quite serious if the size of the series to be heated in the furnace is small, whereby the load and/or temperature of the furnace has to be changed frequently or there are frequent pauses etc. A further problem is that the glass made in the furnace is very operator-dependent, i.e. if the operator is inexperienced or has insufficient basic schooling required for operating the furnace, the final result can be quite inferior.

A basic reason for the problem is that, because the glass is continuously being supported by the rollers, heat is transferred from the rollers to the glass by conduction which is predominant relative to other heat transfer, particularly at the initial heating stage when the temperature difference between the hot rollers and the glass is great. A further problem is that the average roller temperature does not stay constant between successive loads, but instead decreases load by load if the furnace is loaded with normal loads. When the average roller temperature falls, the heating time of glass has to be increased until the furnace reaches its so-called constant state. Thus, said change in heating time is usually carried out manually based on the temperature taken from the previous load or based on the quality of the previous load.

Furthermore, glass optics is at its best when the glass is as cold as possible throughout, but then again breakage and the tempering result is better the hotter the glass has been heated. Thus, in practice compromises have to be made between the optical quality of the glass and the breakage degree, and the operation has to be limited to a very narrow range. In this case it would be very important to maintain the temperature of successive loads as constant as possible.

SUMMARY OF THE INVENTION

It is the object of the present invention to provide a method and equipment for adjusting the temperature in a tempering furnace provided with rollers, avoiding the above mentioned drawbacks and providing successive loads with as uniform a temperature as possible.

The method of the invention is characterized in that the temperature of the glass sheets is measured inside the tempering furnace, and the dwell time of the glass sheets in the furnace is adjusted by means of the measured temperature.

The equipment of the invention is characterized in that the equipment comprises means for measuring the temperature of the glass sheets during heating and means for adjusting the dwell time of the glass sheets in the furnace by means of said measuring result.

It is an essential idea of the invention that the temperature of the glass is measured inside the furnace and the dwell time of the glass sheets in the furnace is adjusted based on said measuring result. It is the idea of a preferred embodiment that a heating curve is determined and the oscillation time is adjusted based on the measured temperature value such that the temperature of the glass at the following measuring point is conforming to the desired heating curve. It is the idea of another preferred embodiment that the temperature value is measured at the oscillation turning point, i.e. the glass movement stop point. This is extremely important since this way the temperature of the glass is always measured at the same point of the glass, and the measuring point is a point. When moving glass is concerned, the measuring point is a line, leading to impaired accuracy. It is the idea of a third embodiment that the loading table comprises a detector for ensuring that the furnace contains glass at the moment of measuring. It is the idea of a fourth embodiment that the oscillation time is adjusted by adjusting the length of the oscillation.

It is an advantage of the invention that the desired final temperature of the glass is achieved right from the first load and can be maintained at the desired level independent of external disturbances, such as uneven loads, pauses or short series, decreasing the number of scraps and enabling even profitable short series production. A further advantage is that the outlet temperature of glass can be determined as low as possible and successive loads are of equal temperature, whereby good surface optics of glass is achieved, i.e. waviness and hot points are avoided. Still a further advantage is that the quality of glass is maintained high irrespective of the operator's skills.

BRIEF DESCRIPTION OF THE DRAWING

The invention will be described respect of more detail in the attached drawing in which FIG. 1 schematically shows a sectional side view of a horizontal tempering furnace according to the invention, and FIG. 2 schematically shows a sectional top view of the horizontal tempering furnace of FIG. 1.

In the tempering furnace 1, the glass sheets 4 undergo a back-and-forth movement, i.e. the sheets are oscillated, in a manner fully known per se, for arranging the roller support points evenly upon the whole glass through the entire heating stage. This is a way to minimize deformations in the glass optics caused by uneven support of the glass.

The housing is provided with pyrometers 7 for measuring the temperature of the glass inside the tempering furnace 1. Pyrometer measurement is an optical measurement, based on the wavelength sent by a piece and is fully known per se to those skilled in the art and is hence not described in any greater detail here. On the basis of the information of the temperature of the glass, the oscillation speed of the furnace can be controlled in order to always achieve the desired final temperature for the glass. Typically, the oscillation speed in the furnace is about 250 mm/s and the minimum unidirectional oscillation length 600 mm. The oscillation speed can be adjusted in the range of e.g. 100 to 400 mm/s, whereby the reciprocating oscillation time varies. Oscillation takes place during the entire heating period. It is advantageous to start adjusting the oscillation speed at the point when the temperature of the glass exceeds e.g. 500° C. The oscillation time may also be adjusted by changing the oscillation travel length. As to the longitudinal heating balance of the furnace, it is advantageous to have an equal oscillation speed in both directions.

Figure 1:
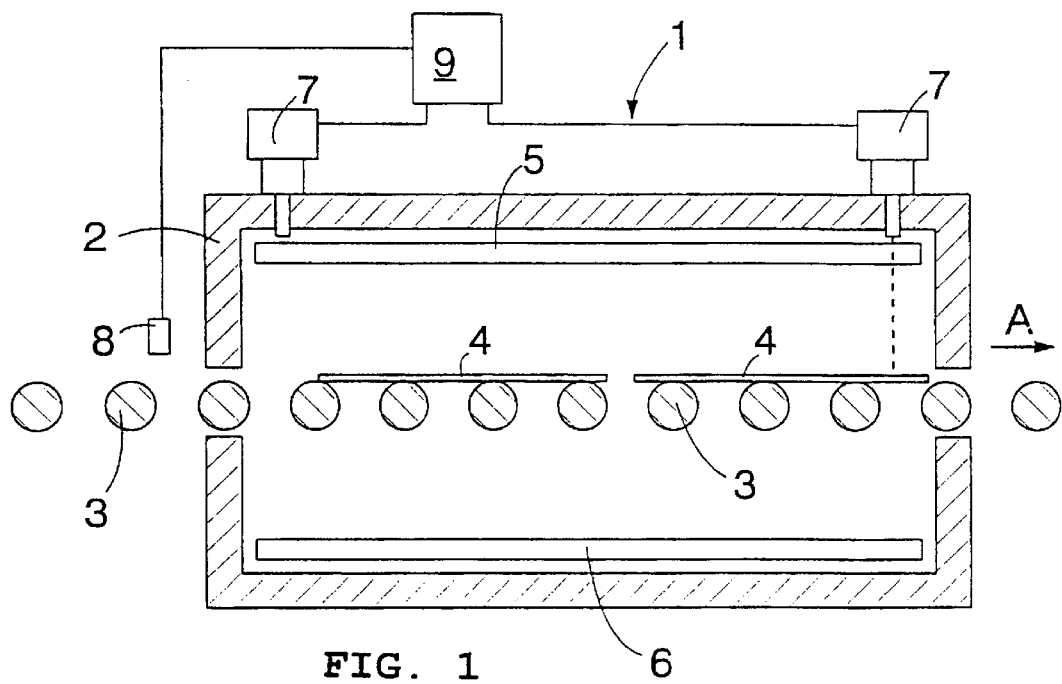
FIG. 1 schematically shows a sectional side view of a tempering furnace 1 according to the invention. The tempering furnace 1 comprises a housing 2 and rollers 3 upon which glass sheets 4 are placed. During the tempering process, the glass sheets 4 are transferred by means of the rollers 3 in the direction of arrow A. As seen in the Figure, a loading table (not shown) is located on the left side of the tempering furnace 1, and a cooling unit for the glass sheets 4 on the right side of the tempering furnace 1. The glass sheets 4 are placed on the loading table upon the rollers 3. The glass sheets 4 are transferred as one load into a heating chamber limited by the housing 2. The glass sheets 4 are typically heated from above with upper resistors 5 and from below with lower resistors 6 in a manner fully known per se. A different manner of heating, such as forced convection or a combination of different heating means, is also feasible. In the furnace, the temperature of the glass is raised to 610 to 625° C. depending on the thickness of the glass.

The loading table comprises a detector 8 for determining how the glass sheets 4 are loaded and for ensuring that, when the load is oscillating in the tempering furnace 1, a glass sheet 4 is always at the oscillation turning point by the pyrometer 7. The pyrometers 7 and the detector 8 are connected with a processor 9, on one hand for controlling the measurement, and on the other hand for adjusting the oscillation speed and/or oscillation travel length of the rollers based on the information supplied by the processor. The detector 8 may also be used to measure the loading degree and the locations of the glass sheets 4. In this case as covering information as possible depicting the loading is automatically read from the load to the processor 9, and the information is transferred with the load as it moves in steps forward in the tempering process. The pyrometers 7 are controlled such that they measure the temperature of the glass at the oscillation turning point, i.e. when there is an immobile glass sheet 4 below the pyrometer. FIG. 1 illustrates the measurement carried out by the pyrometer 7 by a dashed line. A pyrometer measurement of an immobile piece is significantly more accurate than one taken of a moving piece. The rollers 3 are controlled e.g. such that the heating curve according to the thickness of each glass sheet 4 is stored in the memory of the processor 9, the temperature of the glass being observed as a function of time in said curve. In this case the measured temperature value is used to adjust the oscillation time of the glass sheet 4 by adjusting either the oscillation travel length or the oscillation speed, so that an attempt is always made at the following measuring point to get the temperature of the glass to match that determined by the heating curve. The heating curve may naturally always be defined more closely with experience, and other relevant parameters may be included, such as the loading degree and form of the furnace, and the tint and potential coatings of the glass to be heated, etc.

Figure 2:
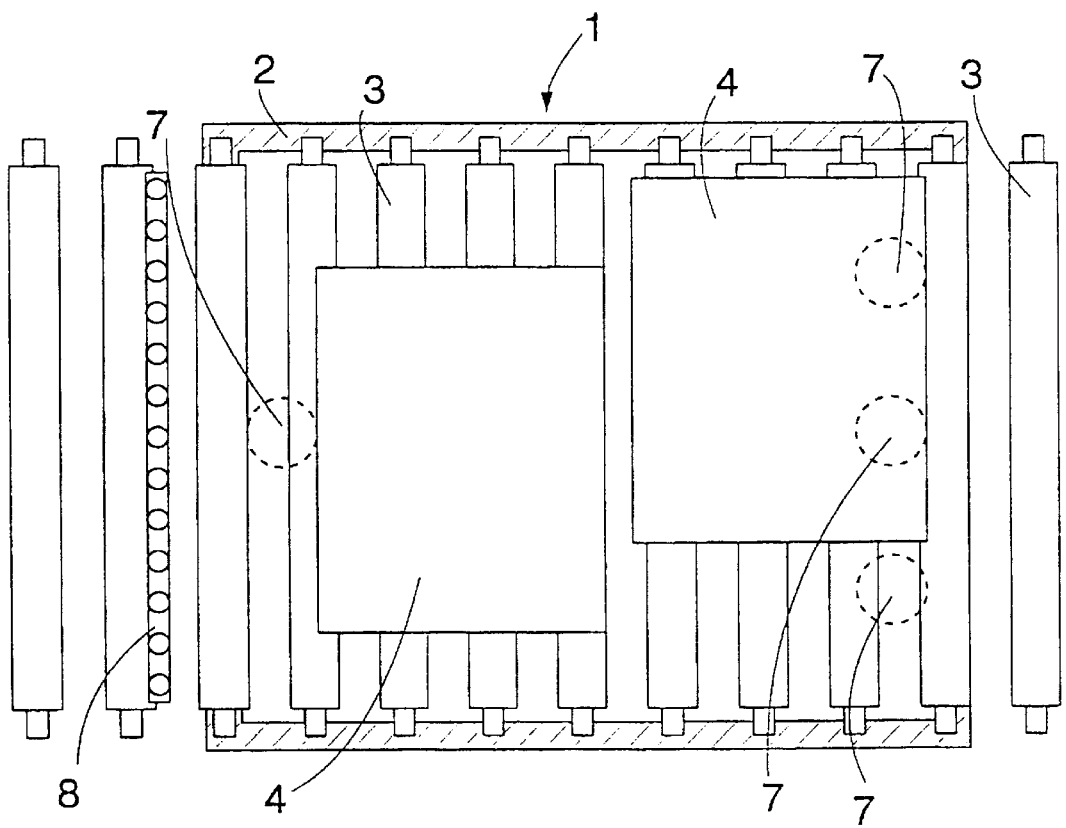

FIG. 2 schematically shows a sectional top view of a tempering furnace 1. The numerals in FIG. 2 correspond to those of FIG. 1. The pyrometer 7 is preferably located in the part near the inlet end of the tempering furnace 1, at the middle line of the tempering furnace 1. The pyrometer 7 may also be arranged at the end of the tempering furnace facing the cooling part, or at both ends of the tempering furnace 1. Furthermore, there may be several parallel pyrometers 7, whereby temperatures can also be measured in the lateral direction of the furnace. This provides the heating balance of the tempering furnace 1 with information as direct measuring data, allowing automatic balancing also in connection with unbalanced loads. In FIG. 2 the pyrometers 7 disposed above the cross section point are shown with a dashed line.

For the sake of clarity, the attached figures do not show e.g. the support structures of the pipes and rollers or the control and rotation means of the rollers, these being known per se to those skilled in the art. Further, for the sake of clarity, the rollers 3, for example, are shown fewer in number and greater in relation to their natural size.

The drawing and the related description are only intended to illustrate the idea of the invention. As to its details, the invention may vary within the scope of the claims.

What is claimed is:

1. A method of adjusting the temperature of a glass sheet in a tempering furnace, said method comprising:

advancing the glass sheet on a roller conveyor through the tempering furnace, heating the glass sheet on the roller conveyor from above and below, oscillating the glass sheet in a reciprocating manner on the rollers as the glass sheet is advanced through the tempering furnace, measuring the temperature of the glass sheet in the tempering furnace, and controlling a dwell time of the glass sheet in the tempering furnace based on the temperature measured of the same glass sheet while in said tempering furnace, wherein during oscillation, the glass sheet is at rest when the sheet undergoes change of direction, the temperature of the sheet being measured when the sheet is at rest.

2. A method as claimed in claim 1, wherein the dwell time is controlled by adjusting a speed of oscillation.

3. A method as claimed in claim 1, wherein the dwell time is controlled by adjusting a length of oscillation.

4. A method as claimed in claim 1, comprising providing a desired heating curve for the glass sheet, and controlling a time of oscillation of the glass sheet in response to measured temperature so that the temperature of the glass sheet substantially corresponds to said heating curve.

5. A method as claimed in claim 1, wherein the temperature of the glass sheet is measured at a plurality of points in the tempering furnace.

6. A method as claimed in claim 5, wherein said points at which the temperature of the sheet is measured are parallel to one another.

7. A method as claimed in claim 1, comprising measuring the temperature of the sheet with a pyrometer.

8. A method as claimed in claim 1, comprising determining locations of the glass sheet before the glass sheet is introduced into the tempering furnace to insure that the glass sheet will be at measuring points in the furnace for temperature measurement of the glass sheet.

9. Equipment for adjusting the temperature of glass sheets in a tempering furnace, said equipment comprising:
- a plurality of rollers in said tempering furnace for supporting and advancing the glass sheets through the tempering furnace in horizontal attitude,
- means for heating the glass sheets from above and below as the glass sheets pass through the tempering furnace,
- means for reciprocating the rollers to oscillate the glass sheets as the glass sheets pass through the tempering furnace,
- means for measuring the temperature of the glass sheets in the tempering furnace, and
- means for adjusting a dwell time of each of the glass sheets in the tempering furnace based on the measurement of the temperature of said each of the glass sheets while in said tempering furnace, wherein the glass sheets are at rest when the sheets change direction during oscillation thereof, said temperature of the glass sheets being measured by said temperature measuring means when the glass sheets are at rest.

10. Equipment as claimed in claim 9, wherein the means for adjusting the oscillation time comprises means for adjusting oscillation time of the means for reciprocating the rollers.

11. Equipment as claimed in claim 9, wherein a plurality of said means for measuring the temperature of said glass sheets are provided in said tempering furnace.

12. Equipment as claimed in claim 11, wherein the plurality of temperature measuring means are parallel to one another.

13. Equipment as claimed in claim 9, wherein the temperature measuring means comprises a pyrometer.

14. Equipment as claimed in claim 9, comprising detector means for determining the position of the glass sheets prior to entry of the glass sheets into the tempering furnace.

* * * * *